N. L. MOEN.
FLOATING FISH TRAP.
APPLICATION FILED JAN. 31, 1910.
969,970.
Patented Sept. 13, 1910
2 SHEETS—SHEET 2.
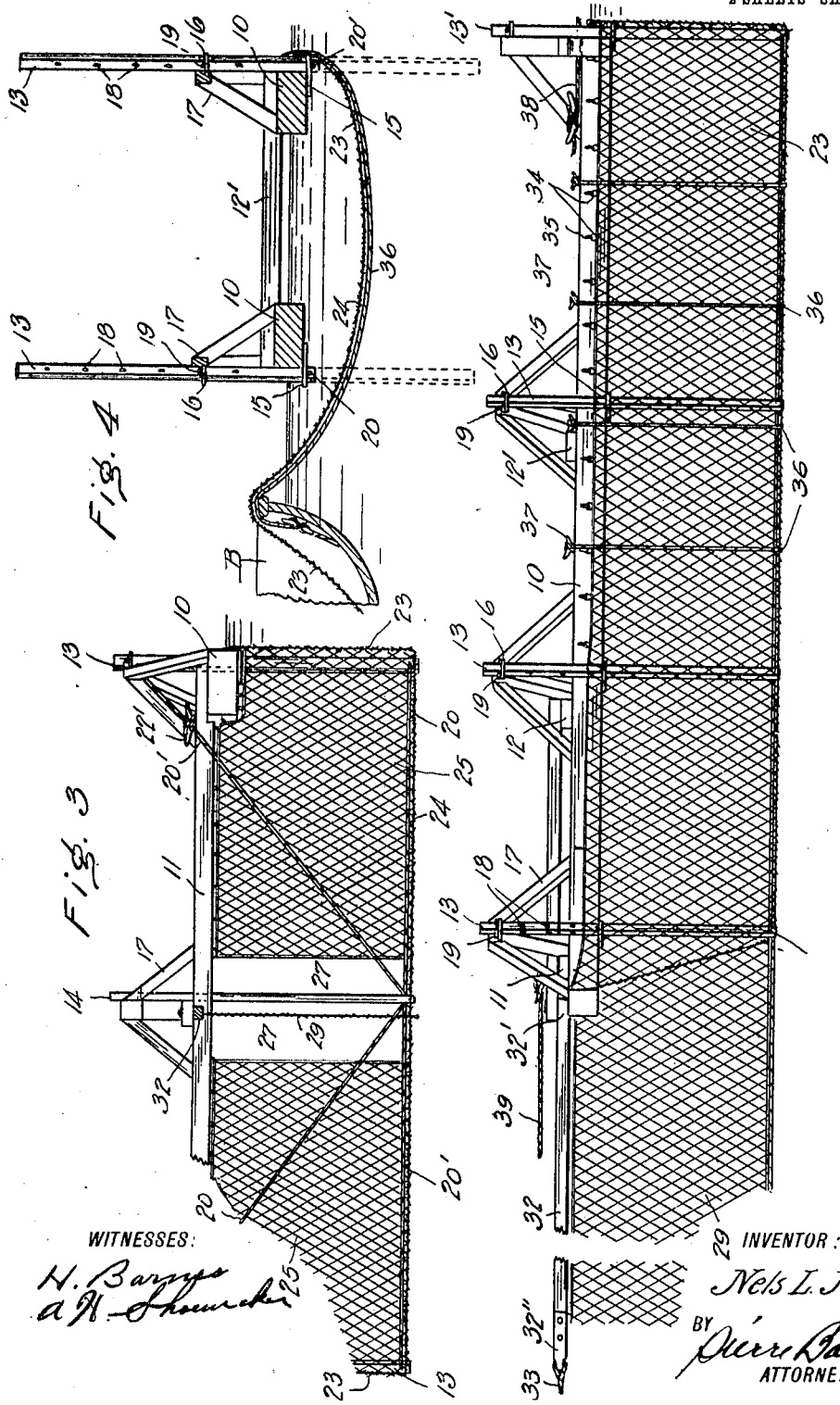

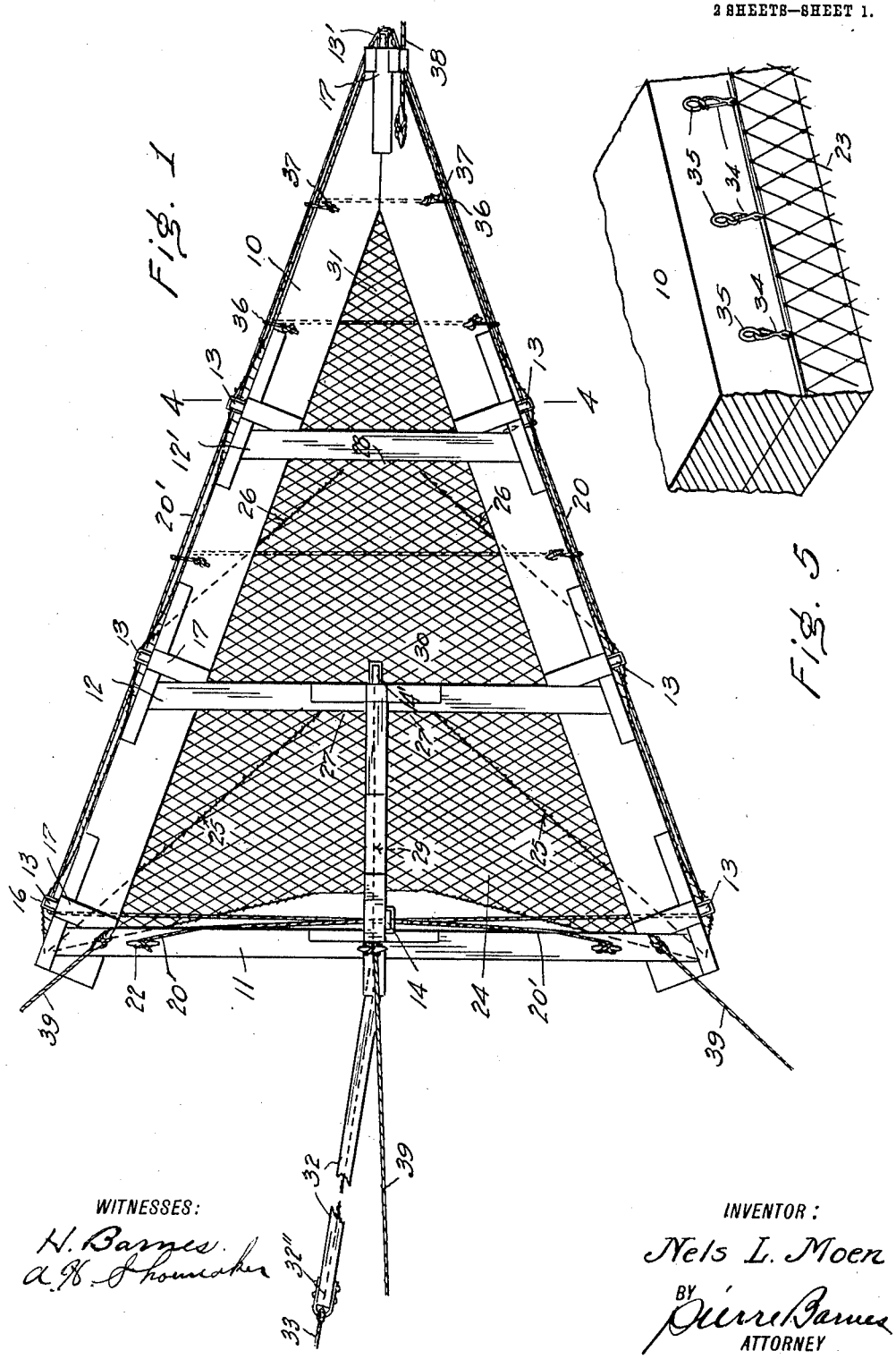

UNITED STATES PATENT OFFICE.

NELS L. MOEN, OF WRANGEL, DISTRICT OF ALASKA, ASSIGNOR OF ONE-HALF TO IVER HANDSETH, OF SEATTLE, WASHINGTON.

FLOATING FISH-TRAP.

969,970.  Specification of Letters Patent.  Patented Sept. 13, 1910.

Application filed January 31, 1910. Serial No. 540,960.

*To all whom it may concern:*

Be it known that I, NELS L. MOEN, a citizen of the United States, residing at Wrangel, Alaska, have invented certain new and useful Improvements in Floating Fish-Traps, of which the following is a specification.

The object of this invention is the provision of a simple and inexpensively constructed floating fish-trap which will be convenient to operate and which is especially adapted for service in rough waters.

The invention consists in the novel arrangement and combination of parts as will be hereinafter described and claimed.

In the accompanying drawings, which illustrate a fish-trap embodying my invention, Figure 1 is a plan view; Fig. 2 is a side elevation; Fig. 3 is a front end view, shown partly broken away; Fig. 4 is a vertical section taken substantially through 4—4 of Fig. 1; and Fig. 5 is a detail perspective view to show the preferred manner of securing the side walls of the trap netting to the trap float.

The reference numeral 10 designates the side members of the trap float which are rigidly secured to each other at their rear ends and thence arranged to diverge toward the front of the trap as shown in Fig. 1. In proximity to the forward ends of said members they are rigidly connected with each other by a transverse beam 11; and one or more similarly disposed beams 12, 12' are advantageously employed intermediate the length of the trap and which are likewise rigidly secured to such side members.

The aforementioned elements constitute the trap frame of a substantially A-shape which affords a strong and rigid structure and is constructed of wood or other material disposed to furnish the requisite buoyancy in water to properly sustain the trap as a floatative body.

Upright poles 13 are provided in spaced relation about the outside of said frame; and supplementary poles 14, 14' may also be provided at about the midlength of the beams 11 and 12. These poles are slidably connected for vertical movement by extending through apertured attachments 15 and 16 which are respectively secured to the adjacent portions of the frame and to rigid supports, such as 17, which are superposed upon the frame. Each of said poles is provided with a plurality of holes 18 which may be selectively used to accommodate lock pins 19 for securing the poles at various adjusted elevations by serving as supports to bear against the respective attachments 16.

Secured to the pole 13' which is positioned at the apex of the frame are the rear ends of two lines 20, 20' which are led along the opposite sides of the trap and rove through holes provided at the lower ends of the respective poles 13 and through a hole in the pole 14 to be thence led to and secured about fastening devices, such as cleats 22 and 22' located near the forward corners of the frame.

Pendent from the frame are side walls 23 of cord netting whose lower edges are connected with or made continuous with the netting 24 which serves for the trap-floor. Said side walls are disposed to be outside of poles 13, 13' and also of the aforesaid lines. Connected with the forward edges of the side walls 23 and extending diagonally rearward in converging directions therefrom are front walls 25; and intermediate the length of such side walls are partition walls 26 which are directed similarly to said front walls. Relatively small openings or passageways 27 and 28 are provided between the respective parts of front and partition walls.

Extending forwardly from between the wall parts 25 is a vertically disposed netting 29 which serves as a "lead" to direct the fish through one or the other of the passageways 27 into the compartment, or "heart" 30 formed between the walls 23, 25 and 26. And from this compartment the fish pass through the passage-way 28 into the compartment, or "pot" 31 beyond the wall 26 and between the side walls 23 in proximity to the rear of the trap.

Advantageously, the lead netting 29 is supported from a water-borne boom 32 having one end, as 32', hingedly connected with the trap frame and its other end 32" is connected by a guy line 33 with an anchor or other securement. The side walls 23 of the trap upon opposite sides of the pot 31 are detachably connected to the frame members 10 as by the use of snap-hooks 34 (Fig. 5) upon the walls engaging eye bolts 35, or an equivalent, provided at intervals along the said members. Extending about the side walls and floor 24, with respect to the pot, are a number of ropes 36 whose ends are detachably secured to said frame members as through the agency of cleats 37, as shown in Figs. 1 and 2.

38 and 39 represent anchor lines for securing the trap in operative position. To employ the trap the netting is first submerged to a suitable depth by paying out the lines 20 and 20′ and pushing down the poles. When the latter are properly regulated and secured by the pins 19, the lines 20 and 20′ are made taut and fastened about the respective cleats 22 and 22′. The lead wall 29 is now adjustably secured in proper direction with respect to the trap frame swinging the boom 32 and whereupon it is fastened by the line 33. The fish then are guided by the lead wall to pass successively through passage-ways 27, the heart compartment 30, and the passage-way 28, to be finally trapped in the pot compartment 31. To remove the fish thus caught a boat B, Fig. 4, is brought alongside of the pot portion of the trap and the ropes 36 at that side of the trap are disconnected from the cleats 37, and passed over upon the boat together with the adjacent top edge of the netting part 23. The ropes 36 and such netting are hauled in upon the boat to deposit the fish in the latter, and which may be facilitated by the employment of hoe-like implements operated by the crew to drag or urge the fish out from the pot and into the boat.

Among the advantages presented by this invention is the provision of a stiff and rigid trap-frame; the disposal of the outer netting walls of the trap exteriorly of the trap frame, whereby a tender may be brought up to such walls; the manner of detachably connecting certain of the net walls for the unloading of entrapped fish from the trap; and the combination of the poles and the line connections therefrom which obviate the use of a supplementary or submerged frame which is unwieldy in rough waters.

What I claim as my invention, is:—

1. In a fish trap, a floatative frame, poles connected to the frame for individual vertical movements, means for securing said poles in adjusted positions, flexible connections between the lower ends of the adjacent poles, and a cord netting depending from said frame and extending exteriorly about said poles.

2. In a fish trap, a floatative frame, of a triangular shape comprised of side members which are directly connected with each other at their rear ends and transverse beams connecting the side members at the front end and intermediate their lengths, poles connected to the frame for individual vertical movements, means for securing said poles in adjusted positions, flexible connections between the lower ends of the adjacent poles, and a cord netting depending from said frame and extending exteriorly about said poles.

NELS L. MOEN.

Witnesses:
J. M. PHEBUS,
L. E. WOLFE.